(12) United States Patent
Nakajima

(10) Patent No.: US 6,950,197 B1
(45) Date of Patent: Sep. 27, 2005

(54) CALIBRATION METHOD, INFORMATION PROCESSING APPARATUS AND INFORMATION PROCESSING SYSTEM

(75) Inventor: Nobuyuki Nakajima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/567,989

(22) Filed: May 10, 2000

(30) Foreign Application Priority Data

May 12, 1999 (JP) ............................... 11-132019

(51) Int. Cl.[7] ............ G06F 15/02; B41J 29/393
(52) U.S. Cl. ............ 358/1.1; 358/504; 358/406; 713/178
(58) Field of Search ............... 358/504, 406, 358/1.15; 399/9, 53–60; 347/5–19; 340/500–508, 340/456–457; 713/178

(56) References Cited

U.S. PATENT DOCUMENTS

| | | | | |
|---|---|---|---|---|
| 5,015,991 A | * | 5/1991 | Barr | 340/456 |
| 5,673,106 A | * | 9/1997 | Thompson | 399/9 |
| 5,781,206 A | * | 7/1998 | Edge | 347/19 |
| 5,813,771 A | * | 9/1998 | Ur et al. | 400/74 |
| 5,887,223 A | * | 3/1999 | Sakai et al. | 399/60 |
| 6,297,873 B1 | * | 10/2001 | Furuya | 358/406 |

OTHER PUBLICATIONS

Microsoft Press Computer Dictionary, Third edition, Microsoft Press, 1997.*

* cited by examiner

Primary Examiner—King Y. Poon
(74) Attorney, Agent, or Firm—Fitzpatrick, Cella, Harper & Scinto

(57) ABSTRACT

A calibration process that manages calibration execution timings for a plurality of printers uniformly to keep the print characteristics of individual printers constant. More, specifically, in the printer, the calibration record information representing the time that has elapsed from the previous calibration is obtained. Based on this record information, a check is made to see whether the elapsed time has exceeded a predetermined period. When it is decided that the predetermined period of time is exceeded, a warning is displayed to urge the user to execute the calibration. With this process, the user can easily perform the calibration at predetermined intervals.

8 Claims, 19 Drawing Sheets

FIG.3B

SHEET TRANSPORT DIRECTION

MAGENTA / CYAN / YELLOW / BLACK

| POSITION NUMBER | ACTUAL OUTPUT DATA | POSITION NUMBER | ACTUAL OUTPUT DATA |
|---|---|---|---|
| 0 | 0 | 41 | 164 |
| 1 | 4 | 42 | 168 |
| 2 | 8 | 43 | 172 |
| 3 | 12 | 44 | 176 |
| 4 | 16 | 45 | 180 |
| 5 | 20 | 46 | 184 |
| 6 | 24 | 47 | 188 |
| 7 | 28 | 48 | 192 |
| 8 | 32 | 49 | 196 |
| 9 | 36 | 50 | 200 |
| 10 | 40 | 51 | 204 |
| 11 | 44 | 52 | 208 |
| 12 | 48 | 53 | 212 |
| 13 | 52 | 54 | 216 |
| 14 | 56 | 55 | 220 |
| 15 | 60 | 56 | 224 |
| 16 | 64 | 57 | 228 |
| 17 | 68 | 58 | 232 |
| 18 | 72 | 59 | 236 |
| 19 | 76 | 60 | 240 |
| 20 | 80 | 61 | 244 |
| 21 | 84 | 62 | 248 |
| 22 | 88 | 63 | 255 |
| 23 | 92 | | |
| 24 | 96 | | |
| 25 | 100 | | |
| 26 | 104 | | |
| 27 | 108 | | |
| 28 | 112 | | |
| 29 | 116 | | |
| 30 | 120 | | |
| 31 | 124 | | |
| 32 | 128 | | |
| 33 | 132 | | |
| 34 | 136 | | |
| 35 | 140 | | |
| 36 | 144 | | |
| 37 | 148 | | |
| 38 | 152 | | |
| 39 | 156 | | |
| 40 | 160 | | |

FIG.4

```
PRINTER No.1                    PRINTER No.2
ELAPSED TIME      50h           ELAPSED TIME      17h
NUMBER OF                       NUMBER OF
PRINTED SHEETS    150 SHEET     PRINTED SHEETS    3 SHEET
ENVIRONMENT                     ENVIRONMENT
CONDITION         USUAL         CONDITION         USUAL
CHANGE OF                       CHANGE OF
TONER             NOT DONE      TONER             ```

```
PRINTER No.3                    PRINTER No.4

⋮             ⋮                 ⋮             ⋮

PRINTER No.5                    PRINTER No.6
ELAPSED TIME      32h
NUMBER OF
PRINTED SHEETS    21 SHEET        ⋮             ⋮
ENVIRONMENT
CONDITION         ```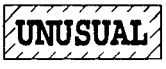
```
CHANGE OF
TONER             NOT DONE

NEXT       OK
```

FIG.18

CALIBRATION METHOD, INFORMATION PROCESSING APPARATUS AND INFORMATION PROCESSING SYSTEM

This application is based on Japanese Patent Application No. 11-132019 (1999) filed May 12, 1999, the content of which is incorporated hereinto by reference.

BACKGROUND OF THE INVENTION

1. Field of the Invention

The present invention relates to a calibration method, an information processing apparatus and an information processing system, and more specifically to a calibration performed for stably keeping at a desired level a print characteristic of a printing apparatus, such as color printer, connected through network to an information processing apparatus, such as personal computer.

2. Description of the Related Art

Generally, it may occur that a print characteristic of a printing apparatus changes depending on environmental conditions, such as temperature and humidity, under which the apparatus is used. It is also known that the print characteristic may change after a certain period of use of the printing apparatus. In the printing apparatus of an electrophotographic system, for example, a photosensitivity characteristic of a photosensitive drum have changed due to the environmental conditions or after use of the printing apparatus and then the print characteristic observed in a printed image, such as a gradation of the printed image changes from a desired one. On the other hand, in a printing apparatus of an ink jet system, it is also known that an ejection characteristic change of a print head may cause the print characteristic to be changed.

The calibration is performed to correct such a change in the print characteristic, but it is not performed only for the change that occurs in an individual printing apparatus. For example, in an information processing system using a plurality of printing apparatus, the print characteristic differences among the plurality of printing apparatus pose a problem. Also in such a case, the calibration is performed to reduce variations of print characteristic among the printing apparatuses.

In conventional execution of such calibration, the calibration is basically executed according to instructions by a user of the printing apparatus, the information processing system or the like. For example, when the user observes that the gradation of the printed image is not a desired one, the user instructs the printing apparatus or a personal computer to execute the calibration through an operation display displayed by the printing apparatus or the personal computer (or simply referred to as "PC").

With the above-described conventional execution of the calibration, however, an appropriate calibration may not be performed responsively to and in matching with the change in the print characteristic, which occurs at that time. More specifically, because the user sets execution timing of the calibration in the conventional execution, the calibration is not performed when the user does not notice the print characteristic change or when the user, if he notices the change, does not think the calibration necessary. In other words, it is not easy to manage the calibration execution timing uniformly, giving rise to a problem of frequent occurrence of density variations or color variations in the printed images.

Particularly in a printing system using a plurality of printing apparatuses interconnected through a network, it is general that there are many users using these printing apparatuses and thus the problem that the execution timing cannot be managed uniformly becomes more significant. In a system using the plurality of printing apparatuses, differences in the print characteristic itself or in the print characteristic change among the printing apparatuses, in combination with the above problem, will pose a serious problem in terms of print quality. That is, if the printing is done based on the same print data, the density and hue of the printed result will differ from one apparatus to another.

SUMMARY OF THE INVENTION

The object of the present invention is to provide a calibration method, an information processing apparatus and an information processing system that can manage calibration execution timing for a plurality of printing apparatuses uniformly and then keep a print characteristic of individual printing apparatus or the respective print characteristics among the plurality of printing apparatus constant.

Another object of the present invention is to provide a calibration method that can properly adapt reading of patches in the calibration to an image to be printed and thereby perform a highly precise calibration.

In the first aspect of the present invention, there is provided a calibration method of generating calibration data that is used when generating print data and is made for a calibration on a printing apparatus, the calibration method comprising the steps of:

obtaining a calibration record information for the calibration of the printing apparatus, the calibration record information being obtained as that after generating the calibration data for the printing apparatus has been performed; and executing warning for urging the calibration on the printing apparatus when the obtained calibration record information shows a predetermined value.

Here, the step of executing warning may execute warning for urging the calibration at a level according information indicating a state in which the calibration has not been performed.

In the second aspect of the present invention, there is provided a calibration method of generating calibration data based on image data obtained by reading a patch formed by a printing apparatus, wherein the patch is so formed that a highlight portion of the patch has a greater number of sections distinguished by gradation values and a smaller number of blocks than those of a shadow portion.

In the third aspect of the present invention, there is provided an information processing apparatus for generating calibration data that is used when generating print data and is made for a calibration on a printing apparatus, the apparatus comprising:

obtaining means for obtaining a calibration record information for the calibration of the printing apparatus, the calibration record information being obtained as that after generating the calibration data for the printing apparatus has been performed; and warning means for executing warning for urging the calibration on the printing apparatus when the calibration record information obtained by the obtaining means shows a predetermined value.

Here, the warning means may execute warning for urging the calibration at a level according information indicating a state in which the calibration has not been performed.

In the fourth aspect of the present invention, there is provided an information processing system, which is formed by connecting a plurality of printing apparatus and an information processing apparatus through a network, for generating calibration data that is used when generating print data and is made for a calibration on the printing apparatus, the system comprising:

obtaining means for obtaining a calibration record information for the calibration of the printing apparatus, the calibration record information being obtained as that after generating the calibration data for the printing apparatus has been performed; and warning means for executing warning for urging the calibration on the printing apparatus when the calibration record information obtained by the obtaining means shows a predetermined value.

Here, the warning means may execute warning for urging the calibration at a level according information indicating a state in which the calibration has not been performed.

According to an above configuration, the calibration for the printing apparatus is executed by the information processing apparatus in a manner that, when the calibration record information is information to urge execution of the calibration, such that time elapsed from the previous calibration performed for the printing apparatus is in excess of a predetermined time, a warning is given to urge execution of the calibration. This allows the calibration execution timing of the individual printing apparatus and the respective calibration execution timings among the plurality of printing apparatus to be managed uniformly.

Further, because the level of the warning is differentiated according to the information representing a condition in which the calibration has not been performed, the user of the printing apparatus can make a plurality of selections with respect to the execution of calibration, such as execution or not execution of the calibration, deletion of calibration data.

Further more, when reading the patch printed for the calibration, the number of gradation levels for the highlight portion of the patch is large. This can allow more detailed information on a change in the print characteristic of the highlight portion to be obtained. On the other hand, increasing the number of patch patterns for the shadow portion can cause variations in reading the shadow portion to be compensated for.

The above and other objects, effects, features, and advantages of the present invention will become more apparent from the following description of embodiments thereof taken in conjunction with the accompanying drawings.

BRIEF DESCRIPTION OF THE DRAWINGS

FIG. 3 is a diagram showing a relationship of FIGS. 3A and 3B;

FIGS. 3A and 3B are diagrams schematically showing patch data used in the above-mentioned processing, respectively;

FIG. 4 is a diagram showing a relation between arrangement positions of data sections in the patch data and their gradation values;

FIG. 18 is a diagram showing a display of calibration record information according to a second embodiment of the present invention.

DESCRIPTION OF THE PREFERRED EMBODIMENTS

Embodiments of the present invention will be described in detail by referring to the accompanying drawings.

First Embodiment

Figure 1:
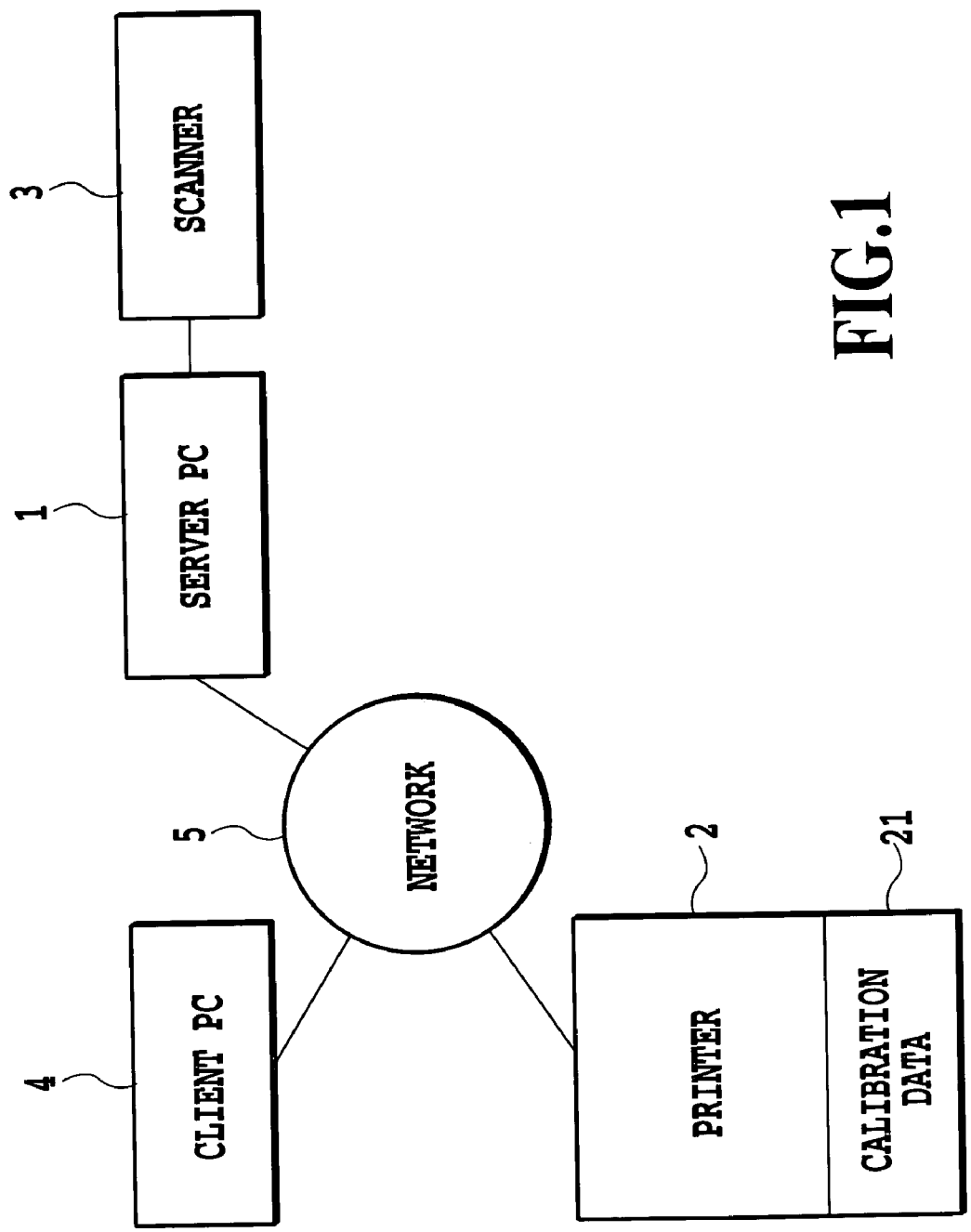
FIG. 1 is a block diagram showing a configuration of an information processing system according to a first embodiment of the present invention.

FIG. 1 is a block diagram showing a configuration of an information processing system according to one embodiment of the present invention.

The information processing system of this embodiment is constructed by that a network 5 connects a server PC 1, a client PC 4 and a printer 2. The system further includes a plurality of other client PCs 4 and a plurality of other printers 2, which are not shown and connected by the network 5. In this information processing system, a user normally can process documents, images or the like by means of a variety of applications on the client PC 4 and can select one of the printers 2 connected to the network 5 to cause the selected printer to print a processed documents or the like.

The server PC 1 supplies various data such as files in response to requests from the client PC 4 connected to the network. In this embodiment, the server PC 1 executes processing such as generation of a calibration table described later in FIG. 2 and has programs for these processing installed therein. The server PC 1 is connected with a scanner 3. The scanner 3 is driven by a scanner driver on the server PC 1 to read an original document and then supply the read data to the server PC 1. The original data thus read is processed as documents and images by the server PC 1 or client PC 4. The scanner 3, as described later, is also used for reading density of a patch when executing a calibration.

On the client PC 4, the user can use various applications to perform processing corresponding to application used. As for a printing operation, the user can perform, for example, generating and editing documents and images and instructing the printer 2 to execute the printing.

As described above, a plurality of the printer 2 are connected to the network 5 and each of them can perform printing according to instructions from any of a plurality of the client PCs 4, which are similarly connected to the network. The printer 2 of this embodiment is of an electrophotographic system using a laser beam system. The printer 2 has a storage section 21 constructed for storing calibration data. More specifically, each of the printers 2 can be an object of the calibration, which is performed for keeping the print characteristic of the printer appropriate, in a printing system constructed in relation to this embodiment. The server PC 1 downloads a calibration table generated in the calibration to the printer 2 as the calibration data, causing the table to be stored in the storage section 21. The printer 2 can execute a γ transformation of image data by means of the calibration table, which is specifically a γ correction table, to generate print data.

While this embodiment of the printer uses a laser beam system, the present invention is not limited to this application. For example, the present invention may use an electrophotographic system in which light reflected from document directly enters a photosensitive drum, or may use an ink jet system.

As described above, in this embodiment processing for the calibration is performed in the server PC 1 under instructions of a system manager while processing for usual printing is performed in the client PC 4 and a selected printer 2 under instructions of the user.

The calibration of this embodiment with the above configuration will be described below.

Figure 2:
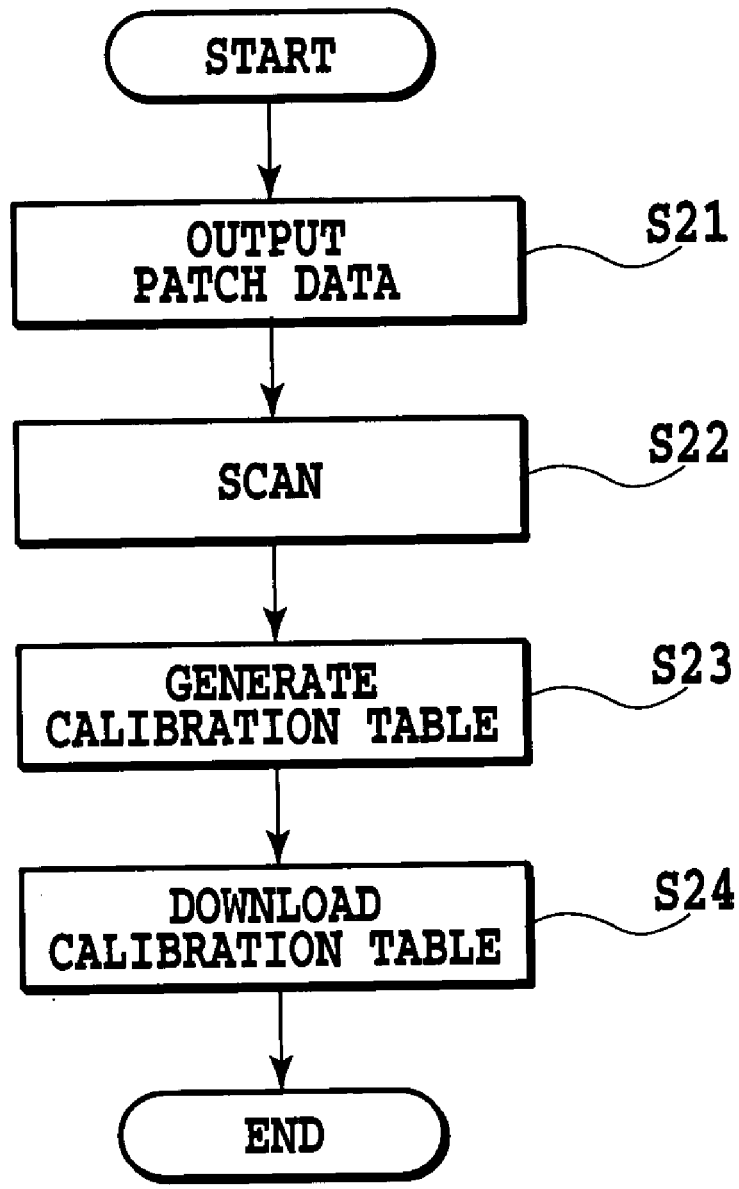
FIG. 2 is a flow chart showing basic processing of a calibration in one embodiment of the present invention.

FIG. 2 is a flow chart showing a procedure for generating the calibration table and a procedure associated with generating of the calibration table, the procedures being executed by the server PC 1.

First, at step S21 a printer to be an object of the calibration is selected. Then, patch data is sent to the selected printer 2 and an instruction is made to the printer to print a patch based on the patch data, via the network 5. The selection and setting of the printer in this system are performed according to a rule of a network management and their descriptions are omitted here.

Figures 3, 3A:

FIG. 3 is a schematic diagram showing an example of the patch data. As shown in the figure, the patch data of this embodiment forms a patch consisting of a total of 1024 sections, 32 vertical by 32 horizontal sections, printed on a sheet of paper. One section of those sections corresponds to one of the toner colors in the printer 2, magenta, cyan, yellow or black, and a figure shown in each section represents information on an arrangement position of the section. The figure also represents density data (gradation data), as shown in FIG. 4. For example, an arrangement position (designated by the figure) "0" has a gradation value of "0," an arrangement position "32" has the gradation value of "128," and an arrangement position "63" has the gradation value of "255." The gradation value for each color in this embodiment is data of 8-bit and takes a value ranging from 0 to 255, as shown in FIG. 4. When the data of each color is represented by other numbers of bits, the gradation value corresponding to the arrangement position in FIG. 4 needs only to be changed according to the number of bits. In the patch shown in FIG. 3, those sections of respective colors with the same figures are located at the same positions in a vertical direction of the patch and together form one block in which they are arranged successively in a horizontal direction and have equal gradation values.

In the patch of this embodiment shown in FIG. 3, blocks thus formed are divided into highlight blocks of relatively low densities, whose arrangement positions are 0–31 (the gradation values are 0–124), and shadow blocks of relatively high densities, whose arrangement positions are 33–63 (the gradation values are 132–255). The highlight blocks and the shadow blocks are arranged over the entire length (32 blocks) of the patch in its vertical direction and, in the horizontal direction, are repeated alternately. In this arrangement, as can be seen from the figure, the same pattern of shadow blocks is repeated twice in the vertical direction. The highlight blocks repeated in the horizontal direction form respective patterns in which the gradation values with respect to arrangement position of the block change cyclically between the respective patterns.

More specifically, in the patch of this embodiment, the pattern of the 32 highlight blocks corresponding to 32 gradation values is arranged at four locations, and the pattern of the 16 shadow blocks corresponding to 16 gradation values is arranged at eight locations. A reason that a number of gradation values differs between the highlight block pattern and the shadow block pattern is that a highlight portion of the printed image having the lighter density requires finer information of a density change, i.e., finer print characteristic change information. Further, a number of shadow block pattern is set 8 patterns which are greater than that of the highlight block pattern because variations in scanner reading tend to be greater with a shadow portion of the printed image than with the highlight portion. The patch arrangement of this embodiment allows a highly precise calibration to be performed with fewer patches.

In the above explanation, the patch data is supplied from the server PC 1 to the printer 2 via the network 5. It is also possible to store in the printer 2 information for constructing the patch data of a format shown in FIG. 3 and, according to an instruction from the server PC 1, generate the patch data based on that information. The information stored in the printer 2 depends on a command system of the printer 2 and its explanation is omitted here.

After the printing of the patch of the step S21 described above is completed, measurement of the printed patch is performed by means of the scanner 3 at Step 22.

The manager for the server PC 1 sets a paper on which the patch is printed on the scanner 3 and causes a scanner driver on the server PC 1 to operate the scanner 3 for reading the patch. The scanner inputs the density of each section as R,G,B signals and transfers them to the server PC 1. For the highlight blocks in the patch, the server PC 1 calculates, according to the arrangement position information of the respective blocks, respective averages of input values of four sections with the same gradation values of the patch data, for each of the four colors—cyan (C), magenta (M), yellow (Y) and black (K). For the shadow blocks, the server PC 1 similarly calculates respective averages of input values of eight sections with the same gradation values for each color. As a result, R,G,B signal values corresponding to 48 gradation values of the patch data are obtained for each of the four C, M, Y, K colors. Then, these R,G,B signal values are transformed into density signal values by means of a brightness-density transformation table, and finally a output density characteristic of the present printer 2 (a print characteristic of this embodiment) is obtained which consists of 48 density values for each of the four colors.

The scanning (reading) by the scanner 3 is performed via the scanner driver of a software operating on the server PC as described above, and setting of a scan resolution and a specification of an input area are also performed by the scanner driver.

Figure 5A:
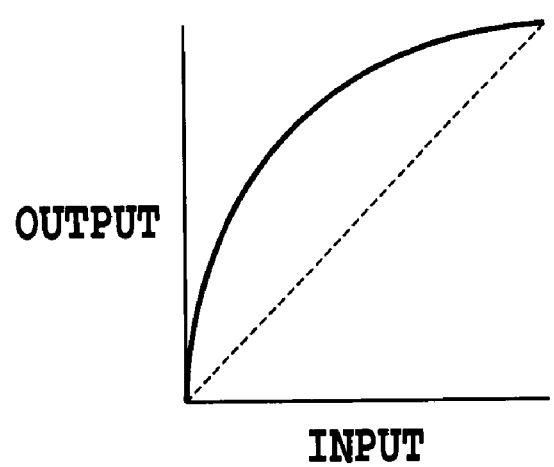
FIGS. 5A, 5B and 5C are diagrams explaining generation of calibration data in the one embodiment of the present invention.
Figure 5B:
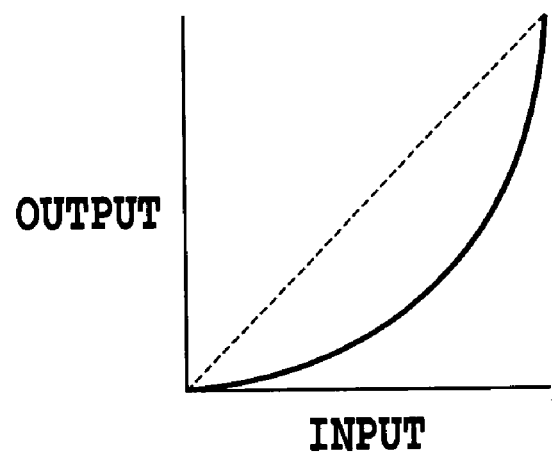
Figure 5C:
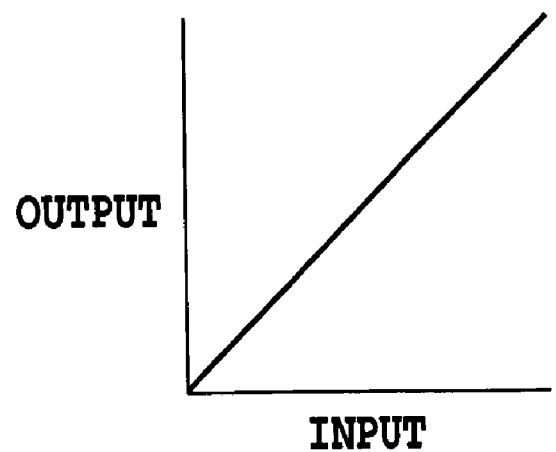

Next, at step S23 the server PC 1 generates the calibration table. FIGS. 5A, 5B and 5C show as to how the table is generated.

FIG. 5A shows the output density characteristic of the printer 2 obtained by the reading at step S22. The figure schematically shows the output density characteristic for only one color for simplicity of explanation. Further, in the following description, explain will be made about table generation processing for only one color.

From the 48 density values obtained at step S22 and by performing an interpolation calculation using the density values obtained, the output density characteristic shown in FIG. 5A is obtained. In this embodiment, the printer having this output density characteristic is calibrated by updating a content of the γ correction table, used for generating the print data, based on the obtained output density characteristic data. More specifically, the content of the γ correction table is set as shown in FIG. 5B so that the input/output relation of the γ correction table has a linear relationship as shown in FIG. 5C. That is, for the input/output function of FIG. 5A, the table has an input/output relation of FIG. 5B, which is an inverse function of FIG. 5A.

After the generation of the calibration table is completed, the server PC 1 at step S24 downloads the calibration data to the printer 2 via the network 5.

In this embodiment, the calibration data to be downloaded is data including the calibration table described above and information on time at which the calibration table is generated, which is attached to the calibration table.

Figure 6:
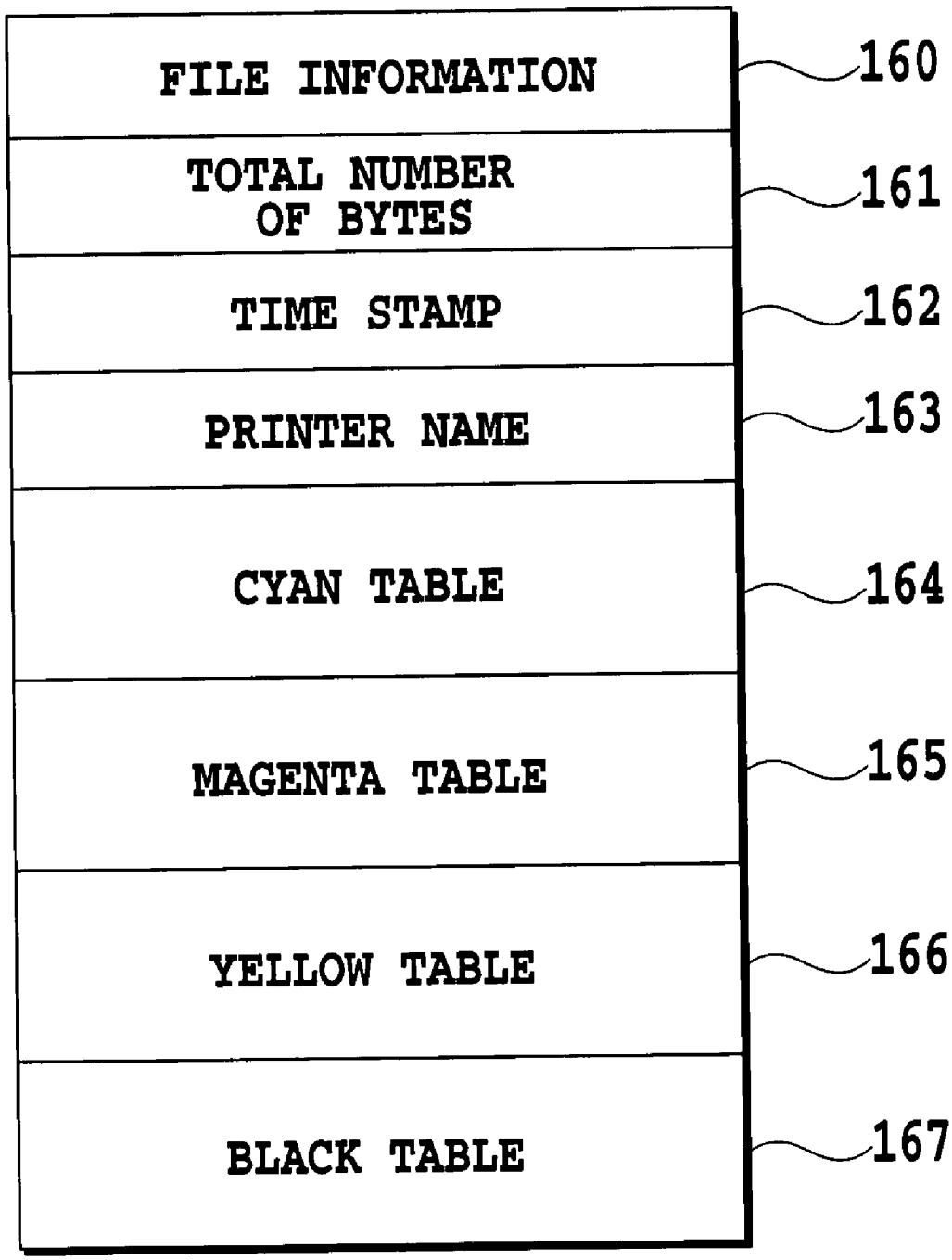
FIG. 6 is a diagram showing the calibration data in the first embodiment of the present invention.

FIG. 6 is a diagram schematically showing a content of the calibration data of this embodiment. As shown in FIG. 6, the calibration data includes respective C, M, Y, K calibration tables (γ correction tables) 164, 165, 166, 167 attached with other file information. Reference numeral 160 denotes identification information (file information) indicating that this data is calibration information. Numeral 161 denotes information on a total number of bytes of the data. Numeral 163 denotes printer name information for identifying the printer for which this calibration information is intended. Numeral 162 denotes time stamp information associated with one example of the present invention, indicating time at which this calibration data was generated.

The calibration data described above is downloaded to the printer, which is identified by the printer name information 163 included in the calibration data, from among a plurality of the printers connected to the network and is the object of the calibration. The downloaded calibration data is stored in the calibration data storage section 21 (see FIG. 1). A download command used for downloading depends on the command system of the printer to which the data is to be downloaded. This is not described here.

A procedure performed in the printer 2 for receiving the downloaded data will be described by referring to FIG. 7.

At step S71 it is checked whether data has been received or not. When it is decided that the data has been received, at step S72 the data is analyzed. When this analysis determines that the data is the downloaded calibration data (step S73), at step S74 the calibration data 164–167 is stored in the calibration data storage section 21. This storage of the calibration data means updating the γ correction table, i.e., calibrating the γ correction table. Further, by using the time stamp information 162 attached to the calibration table, it is possible to perform warning processing associated with the calibration data generation as described later.

On the other hand, at step S73 when the data received is determined to be other than the calibration data, at step S75 the corresponding processing to the data determined.

Figure 7:
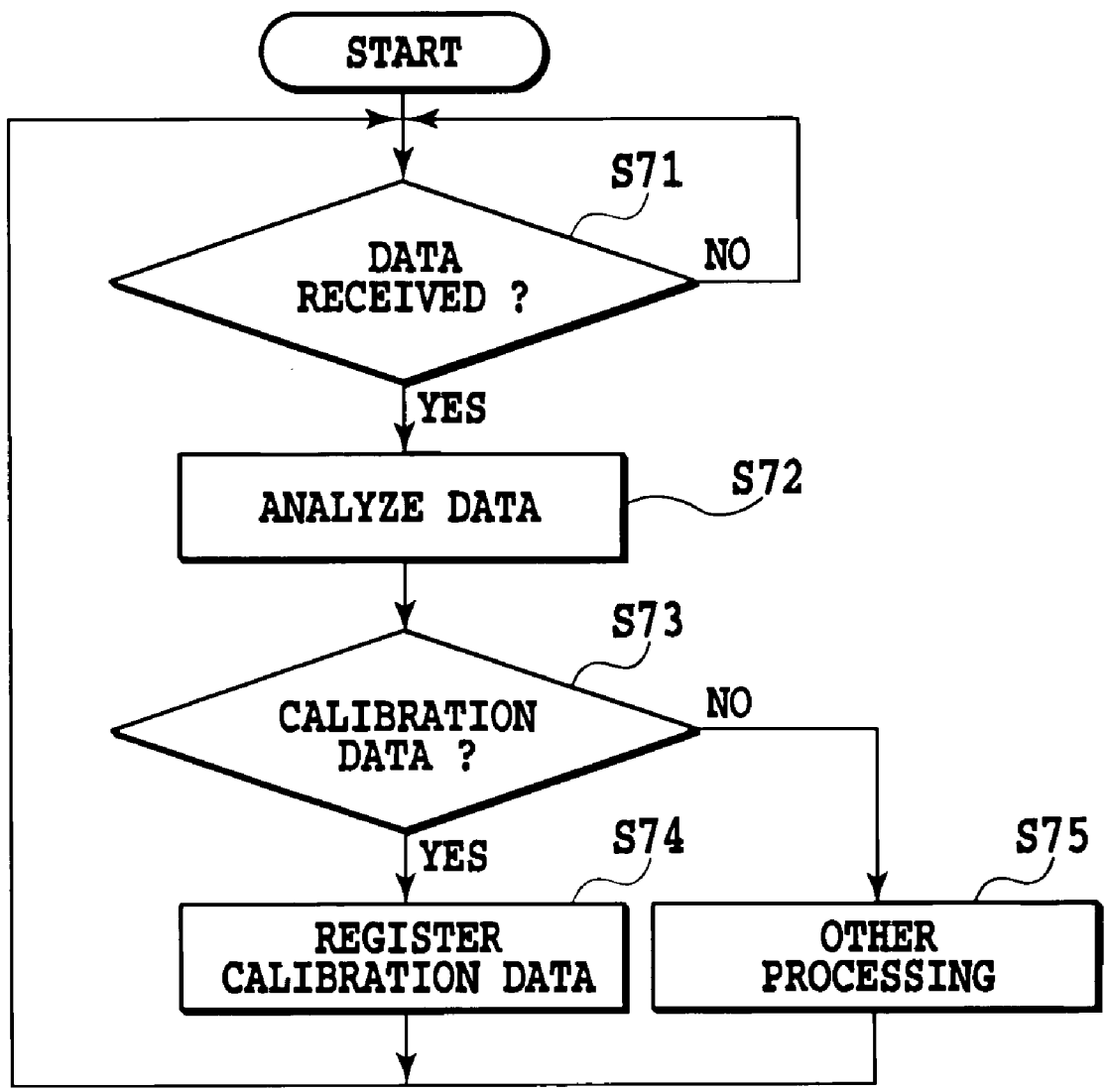
FIG. 7 is a flow chart showing printer processing performed in relation with the calibration in the first embodiment of the invention.

The processing shown in FIG. 7 is what preformed not only when the calibration data is downloaded but also when other general data is downloaded from the server PC 1 or client PC 4. For example, when the print data is downloaded to the printer 2 for ordinary printing, the print data downloading is done according to the procedure shown in FIG. 7. That is, when at steps S72, S73, it is determined that the downloaded data is the print data, at step S75 an analysis of the print data, constructing of a page layout, image processing and a printing operation based on these processing are performed.

Figure 8:
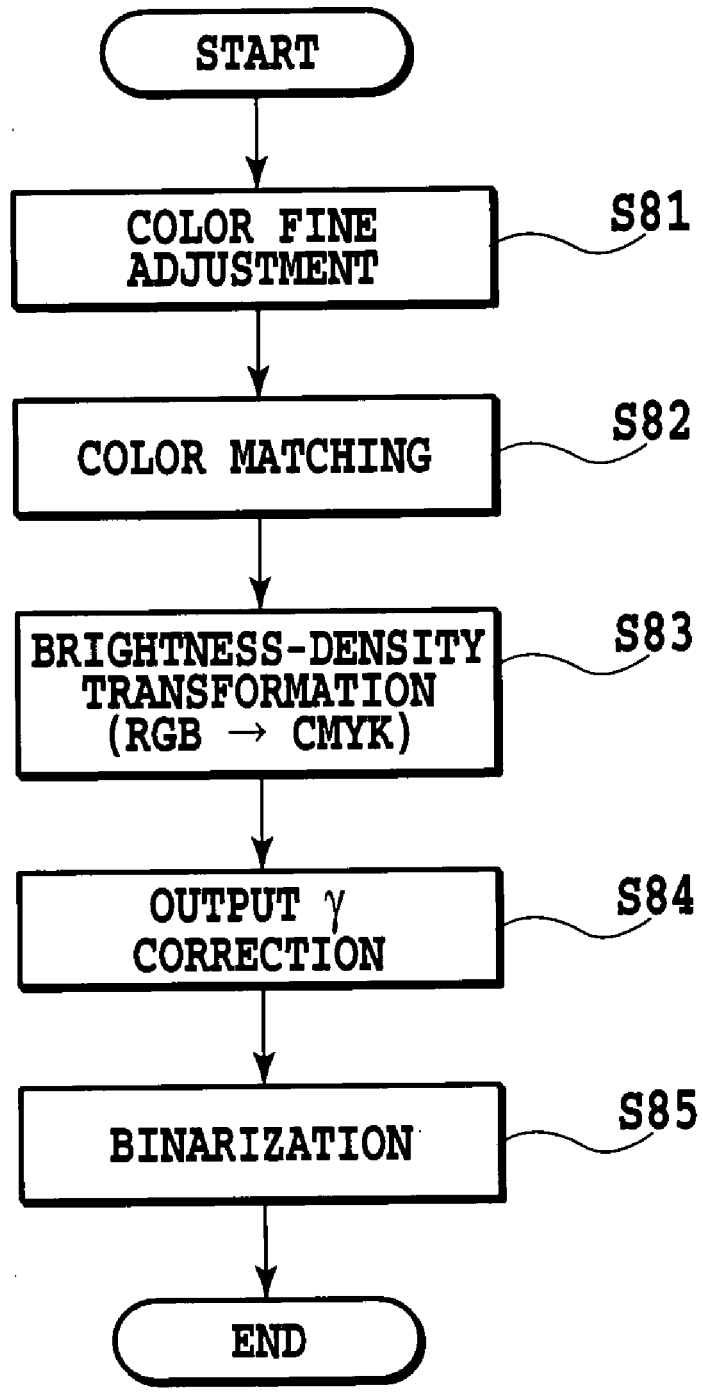
FIG. 8 is a flow chart showing a part of the printer processing, which is associated with ordinary printing.

One example processing for performing a predetermined image processing on the print data downloaded from PC 1 to generate binary data to be used for printing will be explained by referring to FIG. 8.

First, at step S81 a color fine adjustment is made on input signals R, G, B of which print data is composed. The color fine adjustment is to correct brightness and contrast, which are represented by the print data. Next, at step S82 color matching processing is performed. The processing is performed for matching a hue which color displayed by a monitor (not shown in FIG. 1) used in the server PC 1 or client PC 4 can show, to a hue which color printed by the printer 2 can show. Further, at step S83 a luminance-density transformation is executed to transform the input signals of luminance signals R, G, B into density signals C, M, Y, K, which are used in the printer 2.

Next, at step S84 an output γ correction is performed. More specifically, the γ correction is performed on the 8-bit density signals C, M, Y, K obtained at step S83, by using the γ correction table (the calibration data), which is generated according to the output density characteristic of the printer 2 by the calibration process as described above.

After these processing, at step S85 binarization processing for converting the 8-bit signal to a 1-bit signal is performed to be adapted for a configuration of the laser beam system of the printer 2. It should be noted that, in the case that the laser beam system is available in multiple stage outputs, it is known that the 8-bit signal can be converted into two or more bit data according to the available stages.

In the above explanation, the calibration processing of this embodiment and also the image processing using the γ correction table updated by the calibration processing to prepare for the printing performed by the printer 2 have been described. In this embodiment, these calibration and image processing are carried out as application on the server PC 1. In the following, the calibration processing described above and the associated warning processing will be explained in an application aspect.

Figure 9:
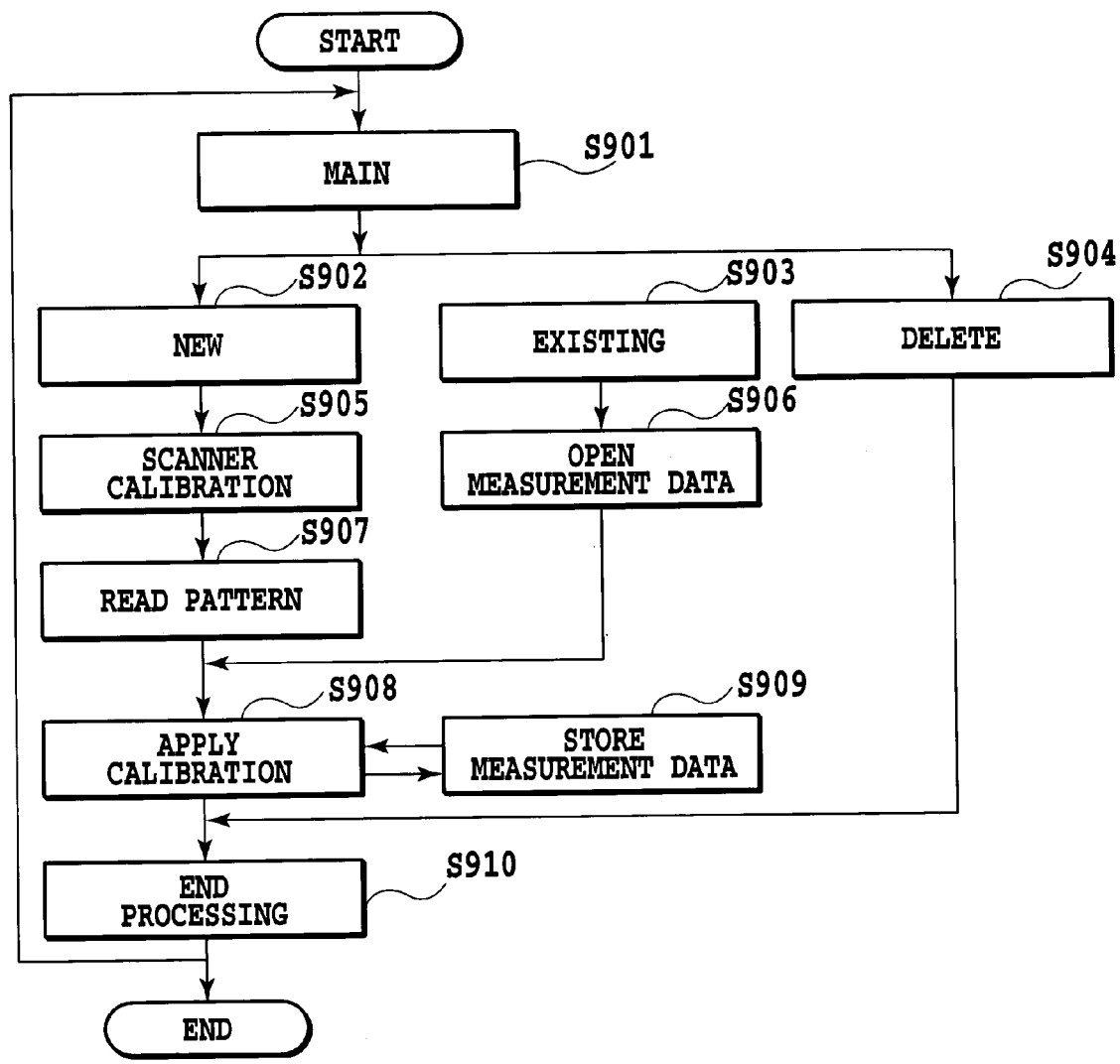
FIG. 9 is a flow chart showing application processing performed in relation with the calibration of the first embodiment.
Figure 10:
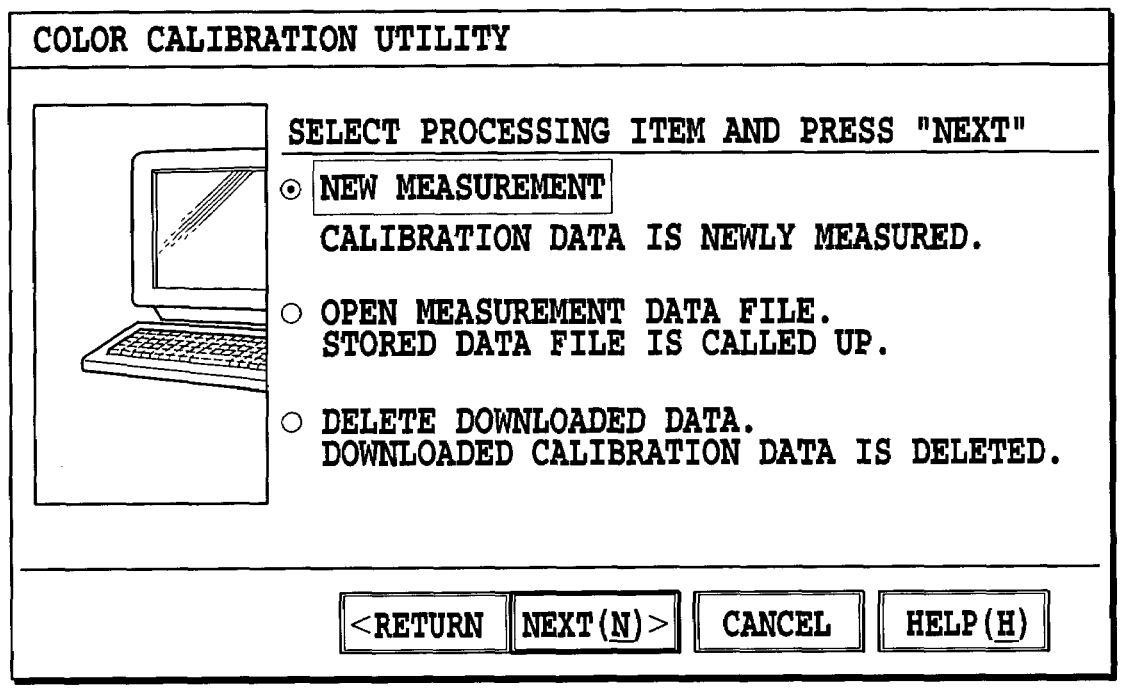
FIG. 10 is a diagram showing an example of a display by the application.

FIGS. 9 and 10 describe a user interface associated with the calibration of the embodiment, with FIG. 9 representing a flow chart of the calibration procedure and FIG. 10 showing a main display as an example display on the monitor in this procedure.

At step S901 shown in FIG. 9, the main display is displayed. As shown in FIG. 10, the main display displays, as a selection menu, three selection items "New measurement," "Open measurement data file," and "Delete downloaded data." On this user interface display, the user can basically select either "Next," "Return," "Cancel" or "Help" to move into another related display.

Selecting the "New measurement" on the main display and pressing the "Next" causes a procedure to proceed to steps S902–S908. That is, by selecting the "New measurement", the user can make an instruction to generate new calibration data.

In response to the instruction, the steps S902–S908 perform the processing described in steps S21–S24 of FIG. 2. First, at step S902 the patch data is output to the printer 2 which has been designated as an object of the calibration. Selection of the printer 2 for the calibration in this processing can be done by a predetermined operation through a display displayed at the step S902.

Next, at step S905 the scanner 3 is calibrated. This calibration is different from that of the printer 2 and is done before the reading of the patch to make the scanner reading characteristic appropriate. Next, at step S907, when the user sets a sheet of paper printed with the patch in the scanner 3, the scanner 3 performs reading the patch. Then, at step S908 the above-described calibration is performed. This processing corresponds to the steps S23 and S24, i.e., generation of the calibration data and downloading of the calibration data to the printer 2.

On the monitor at step S908, a button for entering into the processing of step S909 is displayed. Pressing this button allows the procedure to proceed to the step S909. Step S909 allows the measurement data of the patch read at step S907 to be stored. The patch measurement data stored in this processing can be used for processing that uses existing measurement data as described later.

After completion of the step S909, the procedure returns to the step S908. Then, at step S910 a final display is displayed, on which when the user selects an end of this application, the processing is terminated and returns to processing regarding the main display at step S901.

On the main display displayed at step S901, when the user selects the "Open measurement data file" and pressing the "Next" button, the application program displays a display for designating the measurement data at step S903. On this display, when a "Reference" button is pressed, the program proceeds to the step S906 to read out the measured data stored and to display it for the user to check closely. The read out measurement data is the data contained in the file stored at step S909. At step S908, the measurement data contained in the saved file and displayed for check as described above is used to generate the calibration table and the generated calibration data is downloaded to the printer. With processing of steps S903, S906, because the user can check the measurement data, he or she can know the exact state of the printer. This check also allows the user to make an appropriate decision as to time for exchange a drum with new one.

Further, when on the main display displayed at step S901, the "Delete downloaded data" is selected and the "Next" button is pressed, the processing proceed to step S904 to delete the calibration data stored in the calibration data storage section 21 in the printer 2. This deletion is instructed by means of a command to the printer 2. The detailed description of this command is omitted here.

In one embodiment of the present invention, warning processing is performed to alert the user that the calibration data set as described above is highly likely to be inappropriate for the present printer 2 due to a print characteristic change caused by elapse of time or the like. The warning processing is performed during execution of a certain application relating to printing, such as calibration utility software, processing of which is executed by the server PC 1. When the time that has elapsed after the calibration data was downloaded to the printer 2 selected in the application exceeds a predetermined time so that the downloaded data is highly likely to be inappropriate for the printer 2, a warning is displayed.

Figure 11:
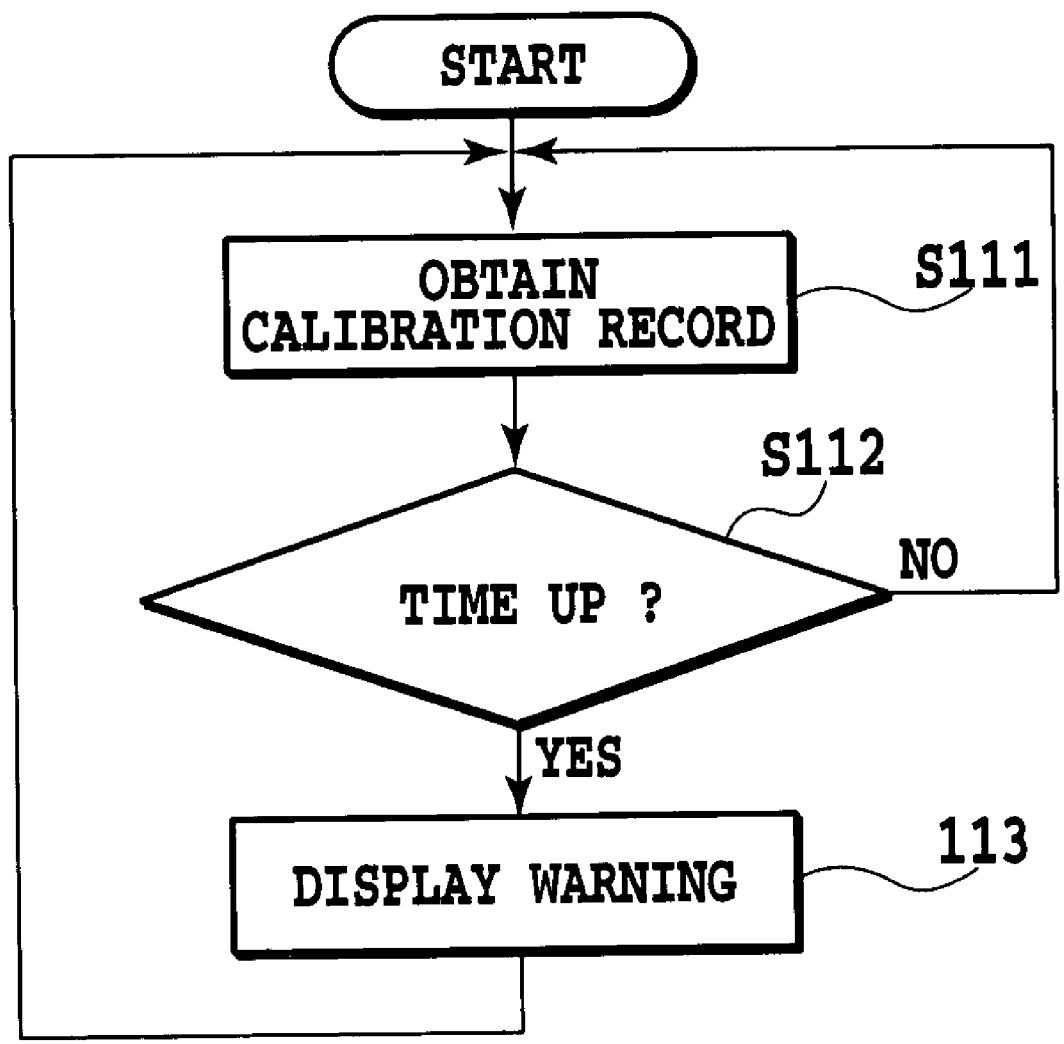
FIG. 11 is a flow chart showing warning processing performed in relation with the calibration of the first embodiment.

FIG. 11 is a flow chart showing the warning processing. This processing is initiated by the above-described application relating to printing at predetermined time intervals. At step S111 time stamp information for the calibration is obtained. The time stamp information is one indicated with the time stamp 162 within the calibration data, which is described referring to FIG. 6 and stored in the calibration data storage section 21 of the selected printer 2. The information can be obtained by issuing a predetermined command to the printer 2 to transfer it from the printer 2 to the server PC 1.

Next, step S112 compares a date of that time with a date when the calibration table stored at that time was generated, the date of generating the calibration data being indicated by the stamp information obtained as described above. When time from the date of generation of the calibration table to the date of that time exceeds a predetermined period, for example one week, it is decided that time for no calibration is up.

On the other hand, when it is decided that the time-up has not yet occurred, the program returns to step S111. When it is decided that the time-up has occurred, at step S113 display for warning is performed.

Figure 12:
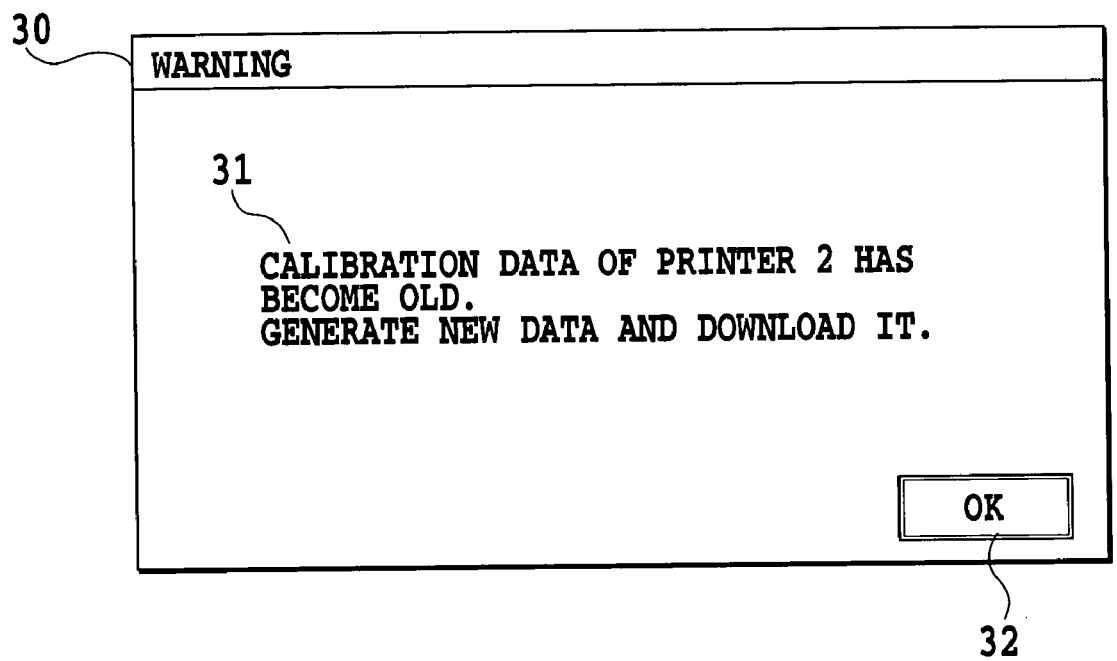
FIG. 12 is a diagram showing a display of a warning message generated by the warning processing.

FIG. 12 is a diagram showing the display for warning. As shown in the figure, in order to perform the warning, a window 30 is displayed on the monitor of the server PC 1 to indicate or urge in the field 31 that the calibration data becomes old and a new table should be generated. The processing shown in FIG. 11 is repeated until an "OK" button on the display shown in FIG. 12 is depressed.

In response to the warning on the display, the user of the server PC 1 (the system manager) may initiates the application associated with the calibration, as explained in FIG. 9, to generate a new calibration table or the like.

As described above, according to the embodiment of the present invention, a warning is issued to urge the user to generate a new table when the time after the calibration table was generated exceeds a predetermined period. With the warning, the user can know that the calibration table for the printer under consideration may highly likely not match the present print characteristic of the printer. Thus, the user can perform the calibration at an appropriate timing. Particularly in the case that a plurality of printers are connected to the system, as in this embodiment, it is possible to manage the appropriate calibration execution timings for individual printers uniformly.

Although in the above explanation the predetermined period is taken to be one week for all printers, it may be differentiated among the printers. For example, if the printer is already known to have a high frequency of printing, the predetermined period may be set shorter.

Second Embodiment

In the first embodiment described above, the time elapsed after performing the latest calibration, which is represented by the time stamp information obtained from the printer, is used as a calibration record information indicating information with respect to performing the calibration. In contrast, this embodiment uses bi-directional communications with each of the plurality of printers connected to the network to obtain information on a number of paper printed after downloading of the calibration data to the printer (after performing the latest calibration), information on as to whether an inside environment (temperature, humidity) of the printer changes and information on as to whether a toner is replaced with another one, as well as the time stamp information, from the respective printers. Then, timing of performing is managed according to these information.

Processing for managing the timing of performing the calibration is initiated in the application relating to printing and operating on the server PC 1, at predetermined time intervals similarly to the first embodiment, that is, similarly to processing shown in FIG. 11. More specifically, at step S111 shown in FIG. 11, the processing obtains through the bi-directional communication with the printer the time stamp information, the information on the number of printed paper, the information on temperature and humidity and the information on replacement of the toner. Then, at step S112, judgement is made whether any one of the above mentioned plurality of information comes to have contents indicating or urging performing the calibration. When any one of the information have the contents urging the calibration performance, at step S113, warning for urging the calibration is performed. In detail explanation, timing for performing the calibration is time when the elapsed time exceeds, for example, one week as described in the first embodiment, time when the number of printed paper exceeds a predetermined number of paper, time when the temperature and the humidity exceed respective predetermined values, respectively and time when the toner is replaced with another one.

In this embodiment, processing of step S111 obtains not only the plurality kinds of information mentioned above from the selected printer for printing but also the plurality of kinds of information from all of the printers connected to the network, and displays as follows.

FIG. 18 is a diagram schematically showing a user interface display displaying the information obtained with respect to the calibration and the warning.

As seen from the figure, the above-described information is obtained for each of all of the printers NO. 1 to 6 and the obtained information is displayed. It should be noted that when the printers connected to the network exceed 6 printers, the information for the exceeded printers is displayed on a next display. Displaying the obtained information for other printers connected to the network as well as the obtained information for the printer selected for the printing operation allows the network manager to know necessity for performing the calibration for other printers as well as for the selected printer, at once. Further, the network manager can know respective conditions of use of the plurality of printers.

In an example shown in the figure, the display indicates that the toner of the printer NO. 2 is replaced with another one. More specifically, in the display, a symbol "Done" indicating that the replacement of the toner has been done is displayed and a surrounding area of the symbol "Done" is expressed by red color. Thus, the display urges the network manager to perform the calibration. As described above, it is desirable to perform the calibration when the toner is replaced with another one, because the replaced toner differs from the toner used till that time in an amount of adhering.

Similarly, with respect to the printer NO. 5, a symbol "Unusual" indicating that the inside environment of the printer is in a unusual state is displayed and a surrounding area of the symbol is expressed by color of red so as to urge the network manager to instruct performing the calibration. The unusual state of the environment denotes that any one of the temperature and the humidity inside the printer exceed the predetermined value, respectively. In the unusual state, the print characteristic greatly may change due to change in the amount of adhering of the toner or the like. Therefor, the calibration is performed in order to adapt the γ table to the state so as to keep the print characteristic appropriate.

In response to the display for warning, the network manager can at the PC server 1 identify the printer which is an object of the warning and carry out an operation regarding the calibration for the printer.

Further, in this embodiment, when the server PC 1 is requested the calibration record information described above from the client PC 4, the server PC 1 send the information to the client PC 4. Further more, in the case that the user of the client PC 4 desires to select any of the printers connected to the network and make the selected printer subjected to the calibration, the user can instruct through the client PC the sever PC to perform the calibration. When the calibration is performed based on the instruction by the client PC, in order that the network manager can detect that the calibration has been performed according to the instruction by the client PC, information for identifying the client PC which has instructed performing the calibration is stored by the server PC.

According to the above-described configuration, the user of the client PC as well as the user (the network manager) may recognizes the calibration record and instructs performing the calibration. This allows the user of the client PC to manage the timing for performing the calibration in accordance with, for example, an object to be printed. For example, in the case of desiring to print high quality image, the user can instruct frequently performing the calibration.

It should be noted that the number of printed paper, and the temperature and the humidity of the printer obtained as the calibration record information can be detected in the printer by a known configuration.

Third Embodiment

While, in the first and second embodiments, of the calibration information downloaded to the printer, the date information for generating the calibration data in the header information is uploaded and, based on the date information, the elapsed time decision is made. On the other hand, the third embodiment, when downloading the calibration table to the printer, stores in the server PC 1 the header information containing the table generation date information and checks whether the predetermined period has elapsed or not based on this information.

Hence, in the information processing system of this embodiment, its basic configuration is similar to that of the first embodiment, except that the header information in the calibration data is retained in the server PC 1 and except for the associated control. Now, the points in which the third embodiment differs from the first and second embodiments will be explained as follows.

Figure 13:
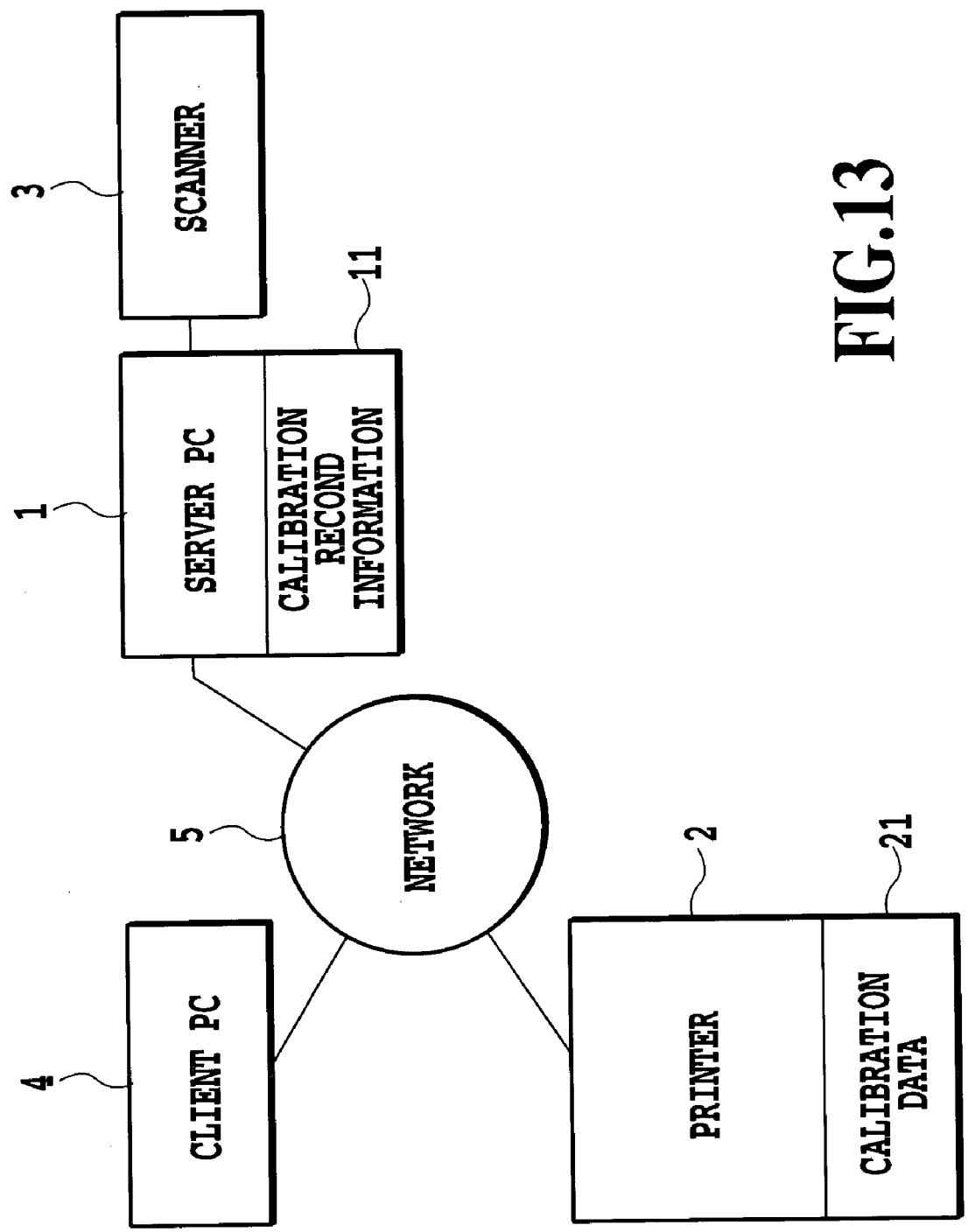
FIG. 13 is a block diagram showing a configuration of an information processing system according to a third embodiment of the present invention.

FIG. 13 is a block diagram showing a configuration of the information processing system of this embodiment. Elements identical with those shown in FIG. 1 of the first embodiment are given the same reference numerals and their explanations are omitted.

In FIG. 13, the server PC 1 has a record information storage section 11, which stores header information of the downloaded calibration tables for all printers connected to the system. Therefor, unlike the first embodiment, the calibration data storage section 21 of the printer 2 stores only the calibration tables.

The calibration table generation processing of this embodiment differs from that of the first embodiment in the information downloaded at step S24 in FIG. 2 and in that the header information is obtained from the record information storage section 11 when obtaining the calibration record at step S111 in FIG. 11.

Figure 14:
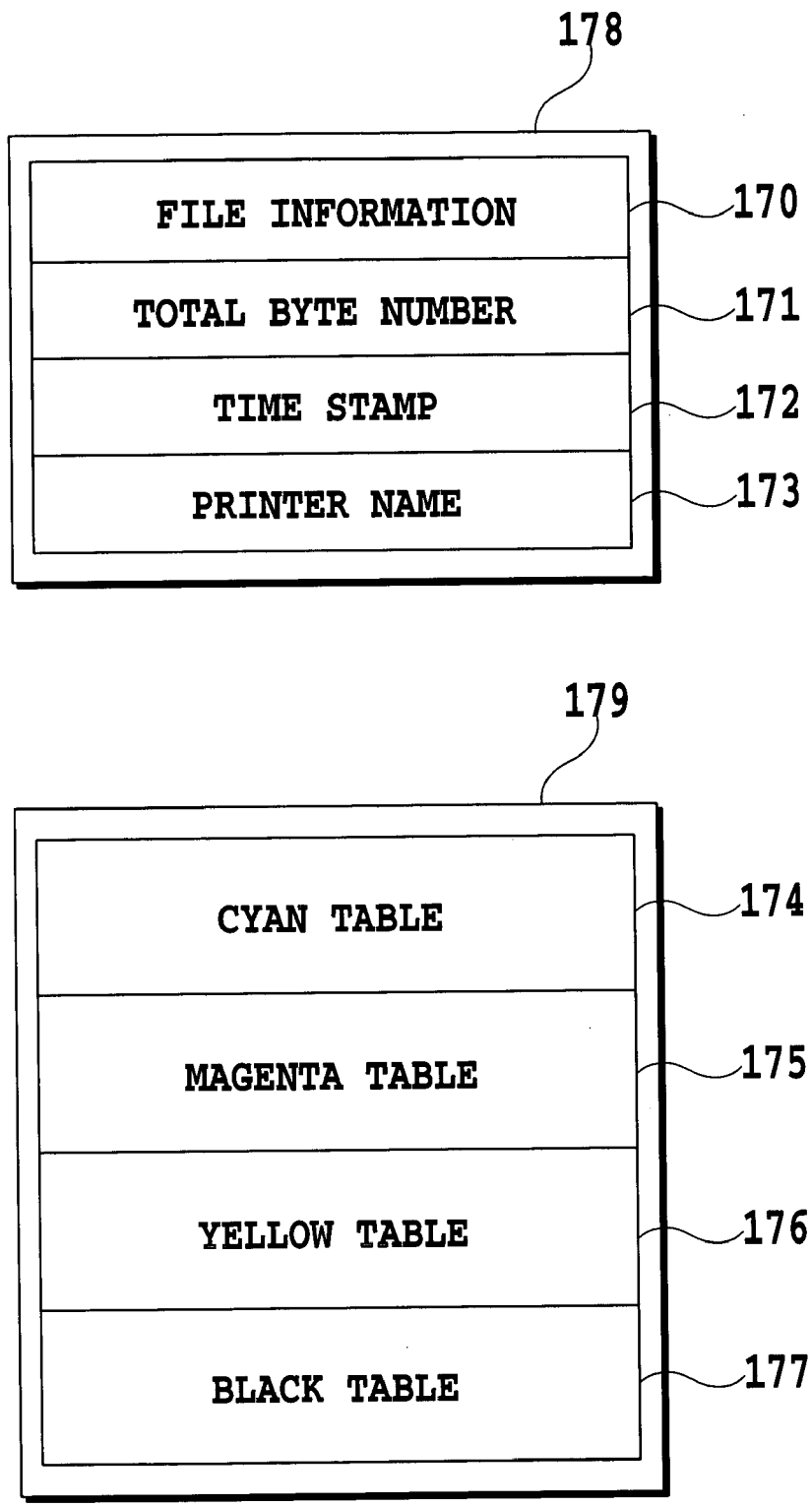
FIG. 14 is a diagram showing calibration data for the third embodiment.

FIG. 14 is a schematic diagram showing the calibration data of this embodiment.

As shown in the figure, the calibration data of this embodiment is divided into a calibration table 179 and a header 178, which are prepared as independent data. What is downloaded at step S24 in FIG. 2 is only the table 179 in this embodiment. On the other hand, the header 178 is stored in the record information storage section 11 of the server PC 1, and at step S111 in FIG. 11 a time stamp 172 of the header is used as the calibration record information.

The header 178 is generated at the same time that the calibration table 179 is generated, and they are related to each other.

According to this embodiment, the header information associated with the calibration of individual printers in the system are stored in the server PC 1 collectively. This allows the calibration processing performed by the server PC, including obtaining the calibration record information on the printers, to be simplified by eliminating the step of identifying the printer and sending a command to that printer.

Fourth Embodiment

In this embodiment when a warning message is displayed, processing for the warning can be skipped. Further, information on whether the warning skipping is done or not is stored. Then, depending on the warning skip information, a warning message level is changed. More specifically, when a second skip is made following the first skip, the calibration data downloaded in the printer is deleted. On the other hand, when no skip is made, the calibration is automatically carried out.

As described above, the configuration of this embodiment is similar to that of the first and second embodiments, except that it has processing for skipping the warning which is issued due to a predetermined period of time elapsing or the like and except a control associated with the skipping.

More specifically, while in the first embodiment a warning is displayed as shown in FIG. 12, this embodiment displays a skip button in the warning window by which the warning level is set.

Figure 15:
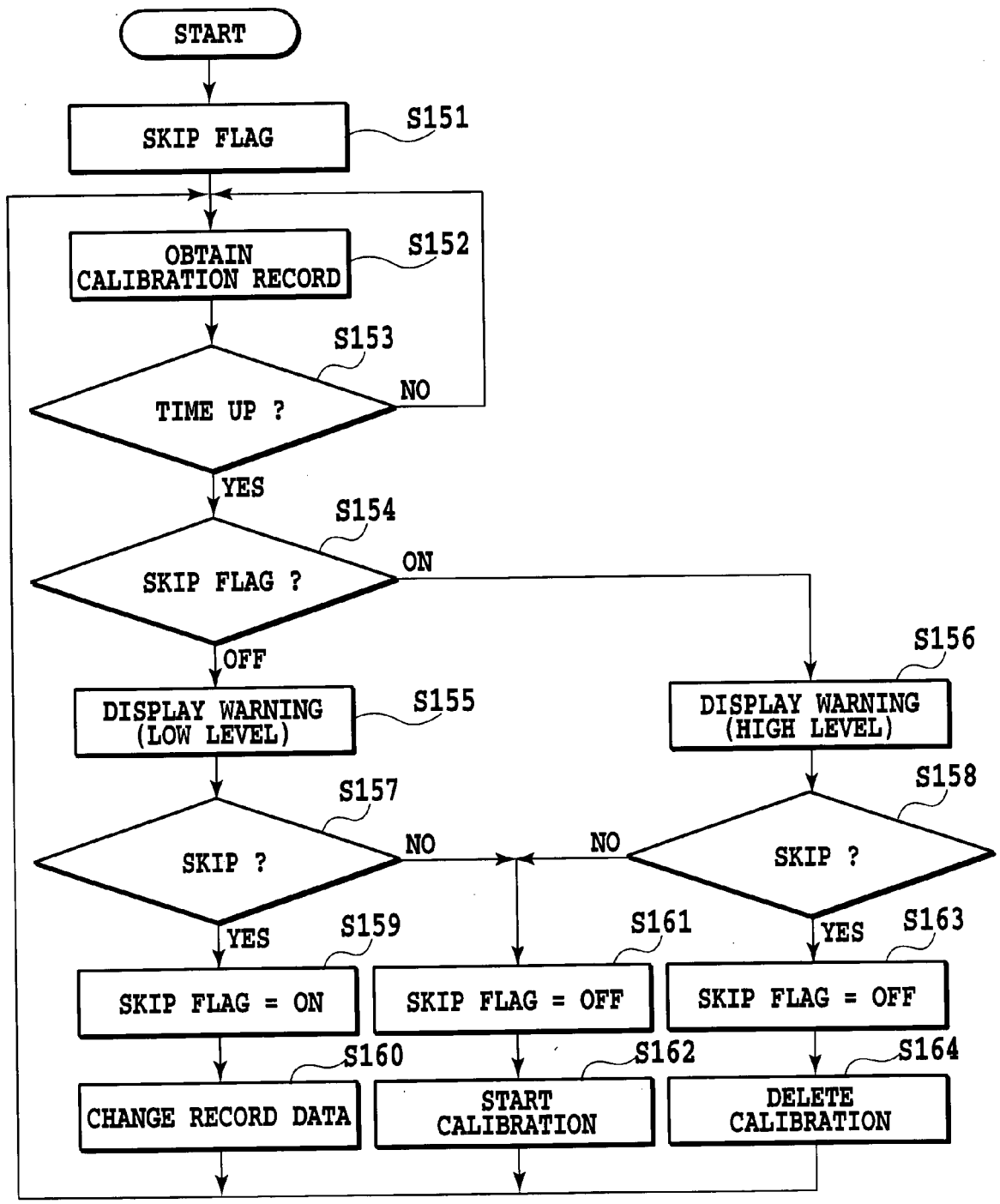
FIG. 15 is a flow chart showing application processing performed in relation with the calibration of a fourth embodiment of the present invention.

FIG. 15 is a flow chart showing processing performed by the application associated with the calibration of this embodiment and this processing is similar to that of the first embodiment shown in FIG. 11.

In FIG. 15, step S151 clears a skip flag, which is formed at a predetermined memory location in the server PC 1. Next, at step S152 time stamp information is obtained as the calibration record information, similarly to the first embodiment. The calibration record information may be stored in the PC 1, as in the third embodiment. In this embodiment, however, it is stored in the calibration data storage section 21 of the printer 2 as in the first embodiment. The printer 2 returns the calibration record information in response to a predetermined command sent to the printer 2.

Next, at step S153 the time stamp information obtained is compared with a date of that time and when it is decided that the time which has elapsed from the generation of the calibration table exceeds one week, the program at step S154 checks the skip flag.

Figure 16:
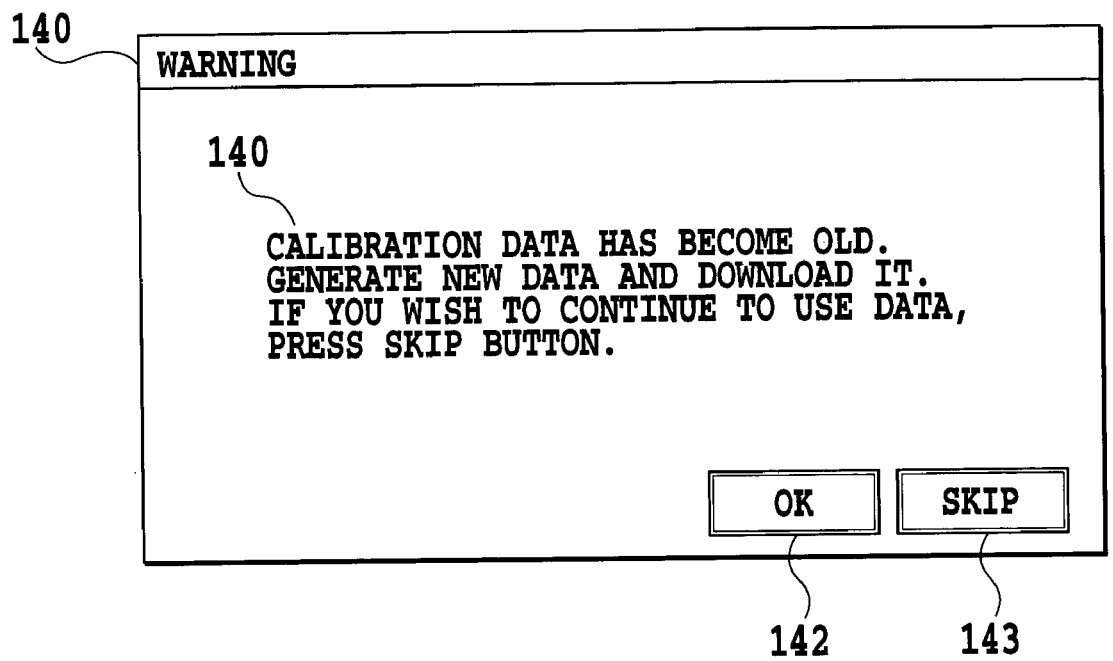
FIG. 16 is a diagram showing a display of a warning message associated with the calibration of the fourth embodiment.

More specifically, when it is decided that the flag remains off and that the warning skip has never been done, the processing at step S155 displays a low-level warning. FIG. 16 is a diagram showing a low-level warning display. The display includes message in the field 141 of the window 140 to urge the user to update the calibration data because the calibration data has become old and, when the user does not wish to generate a new calibration table in response to this warning, to urge the user to press the skip button 143.

After displaying the low-level warning, step S157 checks whether the skip button has been depressed according to the displayed message. When it is decided that the skip button has been pressed, the processing at step S159 turns the skip flag on, followed by step S160 changing the calibration record data. This change of the record data consists actually in rewriting contents of the time stamp information 162 stored in the calibration data storage section 21 of the printer 2 with the date of that time. On the other hand, when at step S157 it is decided that the OK button 142 shown in FIG. 16, rather than the skip button, has been pressed, the processing at step S161 turns the skip flag off and then at step S162 executes the calibration. That is, the processing shown in FIG. 9 of the first embodiment is executed. When at step S154 it is decided that the skip flag is on, this means that the skip has been done before that time and a high-level warning is displayed at step S156.

Figure 17:
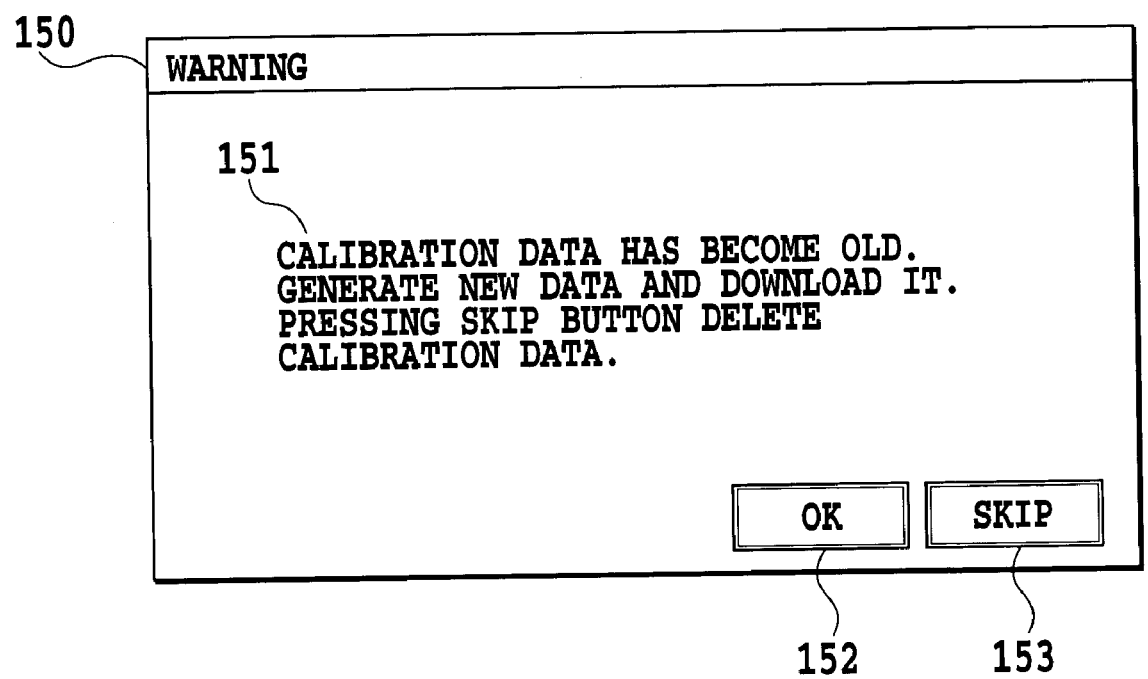
FIG. 17 is a diagram showing another display of a warning message associated with the calibration of the fourth embodiment.

FIG. 17 is a diagram showing the high-level warning message. As shown in the figure, the message displayed in the field 151 of the window 150 urges the user to generate the calibration table and alerts the user that the calibration data downloaded to the printer will be deleted if executing the skipping.

The next step S158 checks whether the skip button has been depressed. When the skip button is found pressed, the processing at step S163 turns the skip flag off and at step S164 deletes the calibration data downloaded to the printer 2. This is because performing the γ correction without using the calibration table, which has become old and no longer matches the present print characteristic of the printer, may be occasionally desirable and the user may make such a decision. When this processing is ended, the processing returns to step S152, as can be seen from the figure. Because the date and time represented by the time stamp is null data, the processing is practically stopped.

On the other hand, when at step S158 it is decided that the OK button has been pressed, the calibration is automatically executed at step S161 and step S162, as described above.

It should be noted that while the user of the server PC 1 (the network manager) decides whether the skipping the calibration should be done or not in this embodiment, the user of client PC may decides about the skipping the calibration when the user recognizes the calibration record and the warning at the client PC as described in the second embodiment.

The fourth embodiment described above allows the user, when the user does not want so high a print quality, to opt for eliminating the step of executing the calibration and for immediately executing the printing, giving the user some degree of freedom and assuring a more flexibility in the information processing system.

While in each of the above-described embodiments the calibration-related processing, such as generation of the calibration data, has been described to be performed by the server PC, the above-described applications may of course be run on the client PCs so that each of the PCs can perform the processing explained above.

Further, in each of the above embodiments, the calibration table generated by the server PC has been described to be transferred to the printer and used by the image processing in the printer. The present invention, however, is not limited to this application. For example, in a system where binarized bit map data is generated in the host device such as server PC, the calibration table, e.g., a calibrated γ table, may be held in the host device.

Other Embodiments

The present invention may be applied to a system consisting of a plurality of devices (such as a host computer, an interface device, a reader and a printer) or to single device (such as a copying machine and a facsimile).

The present invention also includes a configuration in which a computer in an apparatus or system, which is connected with a variety of devices so as to realize functions of the foregoing examples shown in FIGS. 2, 9, 11 and 15, is loaded with a program code of software and in which these devices are operated according to the program stored in the computer (CPU or MPU).

In this case, the software program code itself realizes the functions of these examples. The program code and a means for loading the program code to the computer, such as a storage medium containing a program code, constitute the present invention.

The storage media for storing the program code include floppy disk, hard disk, optical disk, magneto-optical disk, CD-ROM, magnetic tape, nonvolatile memory card and ROM.

The program code is included in the present invention not only when the functions of the aforementioned examples are realized by executing the program code loaded into the computer, but also when these functions are realized by the program code in cooperation with an OS (operating system) or application software running on the computer.

It is needless to say that the present invention further includes a configuration in which the program code is stored in a memory mounted on a computer's function extension board or a function extension unit connected to the computer and the CPU in the function extension board or unit executes a part or all of the actual processing according to the instructions of the program code to realize the functions of the preceding examples.

Apparent from the above explanation, according to the embodiments of the present invention, the calibration for the printing apparatus is executed by the information processing apparatus in a manner that, when the calibration record information is information to urge execution of the calibration, such that time elapsed from the previous calibration performed for the printing apparatus is in excess of a predetermined time, a warning is given to urge execution of the calibration. This allows the calibration execution timing of the individual printing apparatus and the respective calibration execution timings among the plurality of printing apparatus to be managed uniformly.

Further, because the level of the warning is differentiated according to the information representing a condition in which the calibration has not been performed, the user of the printing apparatus can make a plurality of selections with respect to the execution of calibration, such as execution or not execution of the calibration, deletion of calibration data.

As a result, the print characteristic can be always kept a predetermined one and the flexible system for performing the calibration can be provided.

Further more, when reading the patch printed for the calibration, the number of gradation levels for the highlight portion of the patch is large. This can allow more detailed information on a change in the print characteristic of the highlight portion to be obtained. On the other hand, increasing the number of patch patterns for the shadow portion can cause variations in reading the shadow portion to be compensated for.

This allows reading the patch for the calibration to be properly adapted to an image to be printed.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An information processing method, which is applied to an information processing apparatus connected to a printing apparatus through a network, for controlling a calibration that updates an image processing condition used upon generating print data, said method comprising the steps of:
   obtaining calibration record information on the printing apparatus;
   prompting a user to input an instruction for executing calibration on the printing apparatus, based on the calibration record information obtained in said obtaining step; and
   instructing the printing apparatus to execute the calibration, in accordance with the instruction input by the user,
   wherein the calibration updates the image processing condition based on color measuring of test patches output by the printing apparatus, and a time stamp is described as the calibration record information in a header of a file including the updated image processing condition.

2. An information processing method as claimed in claim 1, wherein said step of obtaining the calibration record information includes obtaining the calibration record information for each of a plurality of printing apparatuses, and said step of prompting the user includes prompting the user based on each obtained calibration record information, respectively.

3. An information processing method as claimed in claim 1, wherein the file is held by the printing apparatus, and said step of obtaining calibration record information includes obtaining the calibration record information from the printing apparatus through the network.

4. An information processing method as claimed in claim 1, wherein said step of prompting the user includes prompting the user to input an instruction for executing the calibration at a level according to information indicating a state in which the calibration has not been performed.

5. An information processing method as claimed in claim 4, wherein the information indicating the state in which the calibration has not been performed is information indicating that processing in response to the prompt for instructing the calibration is skipped.

6. An information processing apparatus, which is connected to a printing apparatus through a network, for controlling a calibration that updates an image processing condition used upon generating print data, said apparatus comprising:
   an obtaining part that obtains calibration record information on the printing apparatus
   an instruction part that instructs the printing apparatus to execute calibration, in accordance with the instruction input by the user, wherein the calibration updates the image processing condition based on color measuring of test patches output by the printing apparatus, and a time stamp is described as the calibration record information in a header of a file including the updated image processing condition.

7. An information processing apparatus as claimed in claim 6, wherein said obtaining part obtains the calibration record information for each of a plurality of printing apparatuses, and said warning part executes a prompt to the user based on each obtained calibration record information, respectively.

8. A storage medium storing a program which can be read by an information processing apparatus, the program including an information process, which is applied to the information processing apparatus connected to a printing apparatus through a network, for controlling a calibration that updates an image processing condition used upon generating print data, said process comprising the steps of:

obtaining calibration record information on the printing apparatus prompting a user to input an instruction for executing calibration on the printing apparatus, based on the calibration record information obtained in said obtaining step; and instructing the printing apparatus to execute the calibration, in accordance with the instruction input by the user, wherein the calibration updates the image processing condition based on color measuring of test patches output by the printing apparatus, and a time stamp is described as the calibration record information in a header of a file including the updated image processing condition.

\* \* \* \* \*

UNITED STATES PATENT AND TRADEMARK OFFICE
CERTIFICATE OF CORRECTION

PATENT NO. : 6,950,197 B1
DATED : September 27, 2005
INVENTOR(S) : Nobuyuki Nakajima It is certified that error appears in the above-identified patent and that said Letters Patent is hereby corrected as shown below:

<u>Title page,</u>
Item [57], ABSTRACT,
Line 3, "More," should read -- More --.

<u>Drawings,</u>
Figure 13, Item 11, "RECOND" should read -- RECORD --.

<u>Column 1,</u>
Line 26, "have" should read -- has --.

<u>Column 6,</u>
Line 64, "a output" should read -- an output --.

<u>Column 7,</u>
Line 13, "explain" should read -- explanation --.

<u>Column 8,</u>
Line 6, "what preformed" should read -- what is performed --.
Line 17, "example processing" should read -- example of processing --.

<u>Column 9,</u>
Line 50, "for exchange" should read -- for exchanging --.
Line 53, "proceed" should read -- proceeds --.

<u>Column 10,</u>
Line 35, "initiates" should read -- initiate --.

<u>Column 11,</u>
Line 29, "plurality kinds" should read -- plurality of kinds --.

<u>Column 12,</u>
Line 9, "send" should read -- sends --.
Line 14, "sever" should read -- server --.
Line 23, "recognizes" should read -- recognize -- and "instructs" should read -- instruct --.
Line 61, "Therefor" should read -- Therefore --.

<u>Column 14,</u>
Line 47, "decides" should read -- decide --.
Line 55, "a" should be deleted.

UNITED STATES PATENT AND TRADEMARK OFFICE
CERTIFICATE OF CORRECTION

PATENT NO. : 6,950,197 B1
DATED : September 27, 2005
INVENTOR(S) : Nobuyuki Nakajima It is certified that error appears in the above-identified patent and that said Letters Patent is hereby corrected as shown below:

Column 16,
Line 64, "on the printing apparatus" should read -- on the printing apparatus; and --.

Column 18,
Line 2, "apparatus" should read -- apparatus; --.

Signed and Sealed this

Second Day of May, 2006

JON W. DUDAS
*Director of the United States Patent and Trademark Office*